United States Patent
Oda et al.

(10) Patent No.: US 11,902,137 B2
(45) Date of Patent: Feb. 13, 2024

(54) SERVICE PATH FAILURE LOCATION ESTIMATION METHOD, APPARATUS, AND PROGRAM

(71) Applicant: NIPPON TELEGRAPH AND TELEPHONE CORPORATION, Tokyo (JP)

(72) Inventors: Takuya Oda, Musashino (JP); Shokei Kobayashi, Musashino (JP); Akira Hirano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 141 days.

(21) Appl. No.: 17/286,730

(22) PCT Filed: Oct. 4, 2019

(86) PCT No.: PCT/JP2019/039371
§ 371 (c)(1),
(2) Date: Apr. 19, 2021

(87) PCT Pub. No.: WO2020/085050
PCT Pub. Date: Apr. 30, 2020

(65) Prior Publication Data
US 2021/0385146 A1  Dec. 9, 2021

(30) Foreign Application Priority Data
Oct. 26, 2018  (JP) ................................ 2018-202005

(51) Int. Cl.
*H04L 12/26* (2006.01)
*H04L 12/24* (2006.01)
(Continued)

(52) U.S. Cl.
CPC .......... *H04L 43/10* (2013.01); *H04L 41/0627* (2013.01); *H04L 41/0677* (2013.01); *H04L 43/50* (2013.01)

(58) Field of Classification Search
CPC ............................... H04L 43/50; H04L 43/10
See application file for complete search history.

(56) References Cited

U.S. PATENT DOCUMENTS 5,881,048 A * 3/1999 Croslin ............... H04Q 3/0079
370/258
6,081,812 A * 6/2000 Boggs ................. G06F 11/008
707/999.102
(Continued)

FOREIGN PATENT DOCUMENTS

JP  201453658 A  3/2014

OTHER PUBLICATIONS

J. Postel, Internet Control Message Protocol—DARPA Internet Program—Protocol Specification, Sep. 1981.
(Continued)

*Primary Examiner* — Christopher B Robinson
(74) *Attorney, Agent, or Firm* — Harness, Dickey & Pierce, P.L.C.

(57) ABSTRACT

An estimation method includes: generating information regarding success or not success in a connectivity checking test between "N" nodes in a case in which a failure occurs in a verification target path including the nodes, the information being generated as pattern information for each failure location; selecting "M" network devices from among a plurality of network devices in accordance with occurrence of the failure; executing the connectivity checking test between the selected network devices; comparing a checking result of the connectivity checking test with pattern information that satisfies "N=M" in the pattern information; and estimating the failure location in the service path based (Continued)

on the failure location associated with the pattern information in a case in which the pattern information that satisfies "N=M" matches the checking result.

13 Claims, 8 Drawing Sheets

(51) Int. Cl.
*H04L 43/10* (2022.01)
*H04L 41/0604* (2022.01)
*H04L 41/0677* (2022.01)
*H04L 43/50* (2022.01)

(56) References Cited

U.S. PATENT DOCUMENTS

| | | | |
|---|---|---|---|
| 7,756,046 B2* | 7/2010 | Habu | H04L 41/0677 370/248 |
| 8,160,055 B1* | 4/2012 | Nadeau | H04L 43/10 370/231 |
| 9,924,366 B2* | 3/2018 | Schmidt | H04L 63/123 |
| 11,516,073 B2* | 11/2022 | Oda | H04L 43/0811 |
| 2014/0304361 A1* | 10/2014 | Chauhan | H04L 67/142 709/216 |
| 2015/0023213 A1* | 1/2015 | Soneda | H04L 45/20 370/254 |
| 2015/0256411 A1* | 9/2015 | Kelsey | H04L 43/0811 370/254 |
| 2018/0253346 A1* | 9/2018 | Tang | G06F 11/079 |
| 2021/0385146 A1* | 12/2021 | Oda | H04L 41/0677 |

OTHER PUBLICATIONS

A. Conta et al., Internet Control Message Protocol (ICMPv6) for the Internet Protocol Version 6 (IPv6) Specification, Mar. 2006.

* cited by examiner

| NODE 33 OF ESTIMATION TARGET PATH 4 | NETWORK DEVICE 30 OF SERVICE PATH 5-1 | NETWORK DEVICE 30 OF SERVICE PATH 5-2 |
|---|---|---|
| #1 | NETWORK DEVICE 30-1 | NETWORK DEVICE 30-6 |
| #2 | NETWORK DEVICE 30-2 | NETWORK DEVICE 30-7 |
| #3 | NETWORK DEVICE 30-3 | NETWORK DEVICE 30-8 |

|  | | RETURNING POINT | | |
|---|---|---|---|---|
|  | | 30-1 | 30-2 | 30-3 |
| STARTING POINT | 30-1 |  | G | NG |
|  | 30-2 | G |  | G |
|  | 30-3 | NG | G |  |

Fig. 9

|  | | RETURNING POINT | | |
|---|---|---|---|---|
|  | | 30-1 | 30-2 | 30-3 |
| STARTING POINT | 30-1 |  | G | NG |
|  | 30-2 | G |  | NG |
|  | 30-3 | NG | NG |  |

SERVICE PATH FAILURE LOCATION ESTIMATION METHOD, APPARATUS, AND PROGRAM

CROSS-REFERENCE TO RELATED APPLICATIONS

This application is a 371 U.S. National Phase of International Application No. PCT/JP2019/039371 filed on Oct. 4, 2019, which claims priority to Japanese Application No. 2018-202005 filed on Oct. 26, 2018. The entire disclosures of the above applications are incorporated herein by reference.

TECHNICAL FIELD

The present invention relates to an estimation method, an estimation apparatus, and an estimation program.

BACKGROUND ART

In a case in which a failure has occurred in a communication line or a communication path (hereinafter, referred to as a "service path") configured in a communication network, it is important to estimate a location where the failure has occurred (hereinafter, referred to as a "failure location"). An operator may estimate a failure location using the Internet Control Message Protocol (ICMP) defined by Request for Comments (RFC) 792 and RFC 4443 (see Non Patent Literatures 1 and 2).

In a case in which a failure has occurred in a service path, the operator inputs, to a management device, a transmission instruction using, for example, "ping" of the Internet Control Message Protocol. In a case in which the transmission instruction using "ping" is input, the management device transmits a request message (for example, an "echo request" message) to a network device and receives a response message (for example, an "echo reply" message) from the network device.

The management device changes a transmission destination of the request message in accordance with the transmission instruction using "ping" input by the operator. In this manner, the operator checks continuity (connectivity) between the management device and the network device on the basis of whether the management device has been able to receive the response message from the transmission destination of the request message.

The operator estimates the failure location in the service path on the basis of whether the management device has been able to receive the response message from the network device. However, an operator may mistakenly estimate a failure location. In particular, in a case in which many network devices are included in a communication network, an operator often mistakenly estimates a failure location. Thus, an attempt to use an estimation apparatus adapted to automatically estimate a failure location, instead of manual isolation by an operator, has been made (see Patent Literature 1).

CITATION LIST

Patent Literature

Patent Literature 1: JP 2014-53658 A

Non Patent Literature

Non Patent Literature 1: RFC792, "Internet Control Message Protocol-DARPA Internet Program-Protocol Specification," September 1981

Non Patent Literature 2: RFC4443, "Internet Control Message Protocol (ICMPv6) for the Internet Protocol Version 6 (IPv6) Specification," March 2006

SUMMARY OF THE INVENTION

Technical Problem

The estimation apparatus may estimate a failure location on the basis of a result of comparing result information indicating whether a network device or the like has actually been able to receive a response message with actual network information (apparatuses, topologies, and the like). In a case in which there have been any changes in the network, it is necessary to modify the actual network information that is a target of comparison (hereinafter referred to as "network information for comparison") and a program for comparison (comparison algorithm) every time the network is changed. In this manner, the estimation apparatus in the related art has a problem that it is not possible to estimate a failure location unless the network information for comparison and the program for comparison are changed in accordance with changes in the communication network (for example, deletion, addition, change, and the like of a service path, or removal, addition, change, and the like of a network device). Changes in the communication network may be frequently made, and network information corresponding to the communication network tends to become complicated and huge.

In view of the aforementioned circumstances, an object of the present invention is to provide an estimation method, an estimation apparatus, and an estimation program that enable estimation of a failure location without changing network information for comparison and a program for comparison in accordance with a change in a communication network.

Means for Solving the Problem

One aspect of the present invention is an estimation method executed by an estimation apparatus configured to estimate a failure location in a service path that is a communication line or a communication path configured in a communication network, the method including: generating information regarding success or not success in a connectivity checking test between "N (N is equal to or greater than two)" nodes in a case in which a failure occurs at one or more locations in a verification target path including the N nodes, the information being generated as pattern information for each failure location in advance; selecting "M (M is equal to or greater than two)" network devices configuring the service path from among a plurality of network devices in the communication network in accordance with occurrence of the failure; executing the connectivity checking test between the selected network devices; comparing a checking result of the connectivity checking test with the pattern information that satisfies "N=M" in the pattern information generated in advance; and estimating the failure location in the service path based on the failure location associated with the pattern information that satisfies "N=M" in a case in which the pattern information that satisfies "N=M" matches the checking result.

Another aspect of the present invention is the aforementioned estimation method, in which the number of the nodes in the verification target path is greater than the number of network devices in the service path including a maximum number of network devices among a plurality of the service paths configured in the communication network.

Yet another aspect of the present invention is the aforementioned estimation method, in which a first network device of the network devices configuring the service path transmits a request message to a second network device of the network devices configuring the service path in the connectivity checking test.

Yet another aspect of the present invention is the aforementioned estimation method, in which the second network device configuring the service path transmits a response message to the first network device configuring the service path or the estimation apparatus in the connectivity checking test.

Yet another aspect of the present invention is the aforementioned estimation method, in which the request message is a message of ping or traceroute using Internet Control Message Protocol (ICMP).

Yet another aspect of the present invention is the aforementioned estimation method, in which the network devices are at least either physical nodes or logical nodes in the communication network.

Yet another aspect of the present invention is an estimation apparatus configured to estimate a failure location in a service path that is a communication line or a communication path configured in a communication network, the estimation apparatus including: a generation unit configured to generate information regarding success or not success in a connectivity checking test between "N (N is equal to or greater than two)" nodes in a case in which a failure occurs at one or more locations in a verification target path including the N nodes, the information being generated as pattern information for each failure location in advance; a device selection unit configured to select "M (M is equal to or greater than two)" network devices configuring the service path from among a plurality of network devices in the communication network in accordance with occurrence of the failure; an instruction transmission and reception unit configured to execute the connectivity checking test between the selected network devices; and a location estimation unit configured to compare a checking result of the connectivity checking test with the pattern information that satisfies "N=M" in the pattern information generated in advance, and in a case in which the pattern information that satisfies "N=M" matches the checking result, estimate the failure location in the service path based on the failure location associated with the pattern information that satisfies "N=M".

Yet another aspect of the present invention is an estimation program for causing a computer to execute the aforementioned estimation method.

Effects of the Invention

The present invention can estimate a failure location without changing network information for comparison and a program for comparison in accordance with a change in a communication network.

DESCRIPTION OF EMBODIMENTS

Embodiments of the present invention will be described in detail with reference to the drawings.

Figure 1:
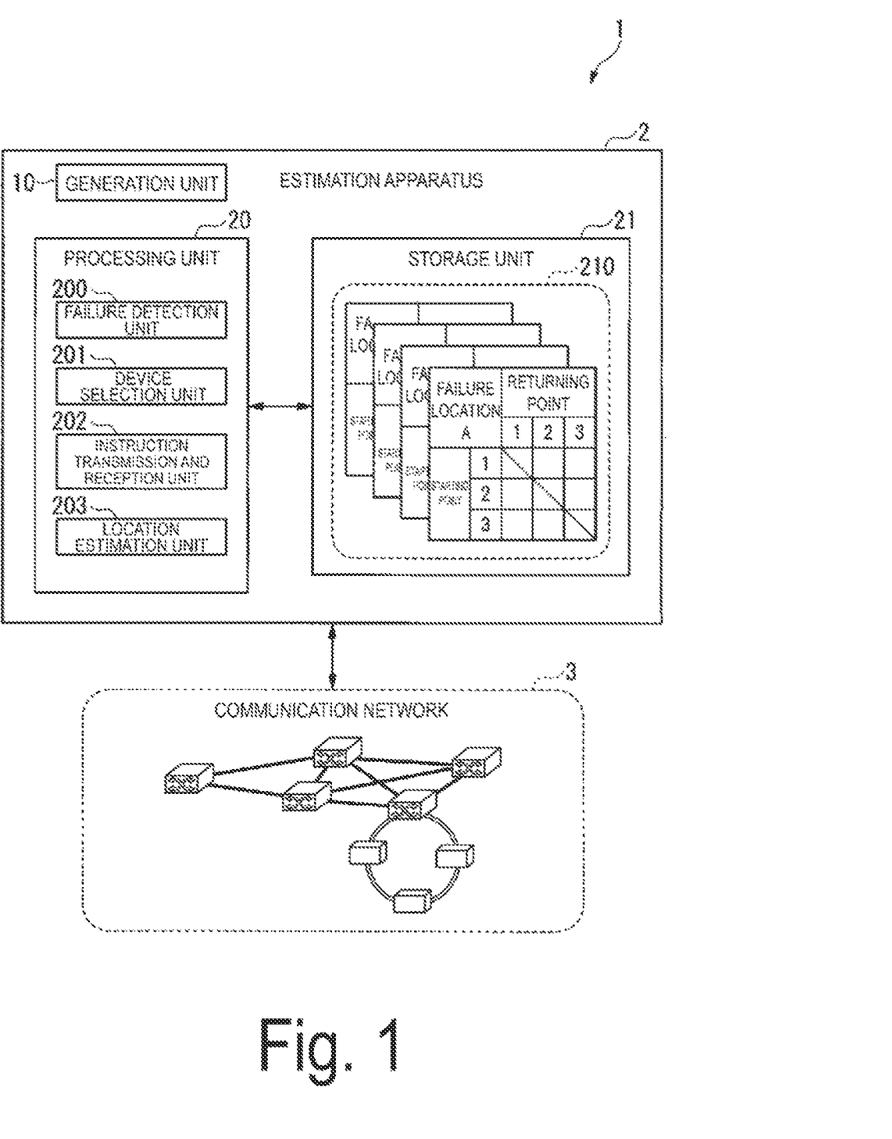
FIG. 1 is a diagram illustrating a configuration example of an estimation system.

FIG. 1 is a diagram illustrating a configuration example of an estimation system 1. The estimation system 1 is a system adapted to estimate a failure location in a communication network. The estimation system 1 includes an estimation apparatus 2 and a communication network 3. The estimation apparatus 2 is an information processing apparatus adapted to estimate a failure location in the communication network. The estimation apparatus 2 includes a generation unit 10, a processing unit 20, and a storage unit 21. The generation unit 10 is partially or entirely implemented by causing a processor such as a central processing unit (CPU) to execute a program stored in the storage unit 21.

The communication network 3 is a network adapted to provide a communication service. The communication network 3 includes a plurality of network devices. The network devices are routers and switches, for example. Hereinafter, the number of network devices configuring a service path will be described as "M."

Next, generation of pattern information through simulation using a model of the communication network 3 will be described using FIGS. 2 to 4.

Figure 2:
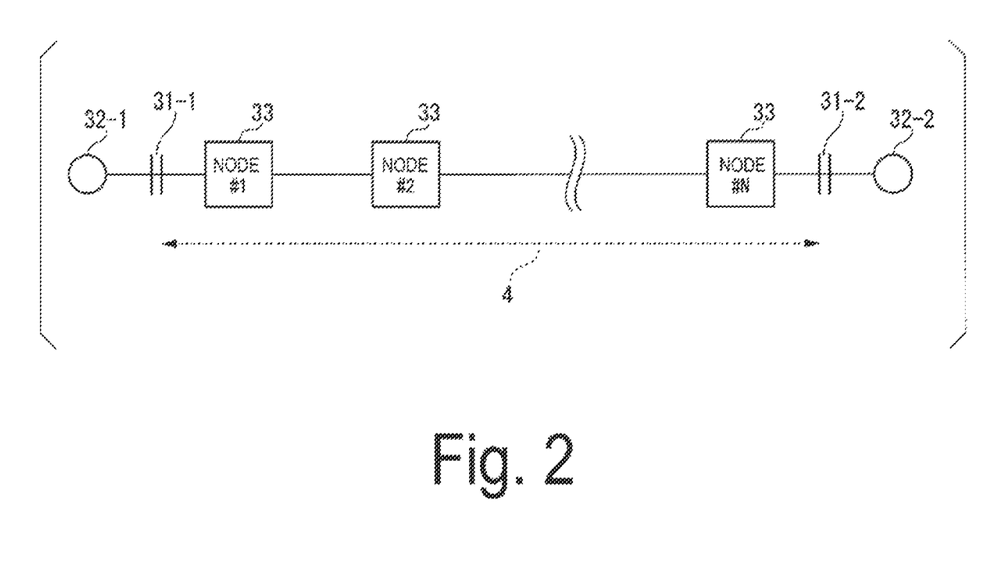
FIG. 2 is a diagram illustrating an example of a path node connectivity of which is verified.

FIG. 2 is a diagram illustrating an example of a path, node connectivity of which is to be verified (hereinafter, referred to as a "verification target path"). A verification target path 4 is a logical path including N generalized nodes 33. The number N is an integer that is equal to or greater than two. The maximum number of N can be the maximum number (maximum number $M_{max}$) of M, which is the number of network devices configuring each of one or more service paths that are present in the communication network 3. The generation unit 10 generates information regarding success or not success in a connectivity checking test between the nodes in a case in which one or more failures have occurred in the verification target path 4 including the N nodes 33. This information is generated as pattern information 210 for each failure location in advance. Note that the pattern information of the verification target path in each of cases of N=2 to N=$M_{max}$ is generated. However, to save the storage capacity, the generation unit 10 may not generate pattern information corresponding to a certain number of network devices when no service path in the communication network 3 includes such a number of network devices. To address changes in the network that frequently occur, N may be from N=2 to N=($M_{max}$+α) (α is a natural number that is equal to or greater than one).

The user network interface 31 represents a connection point between a user network 32 and the service path and may perform processing such as protocol conversion.

Figure 3:
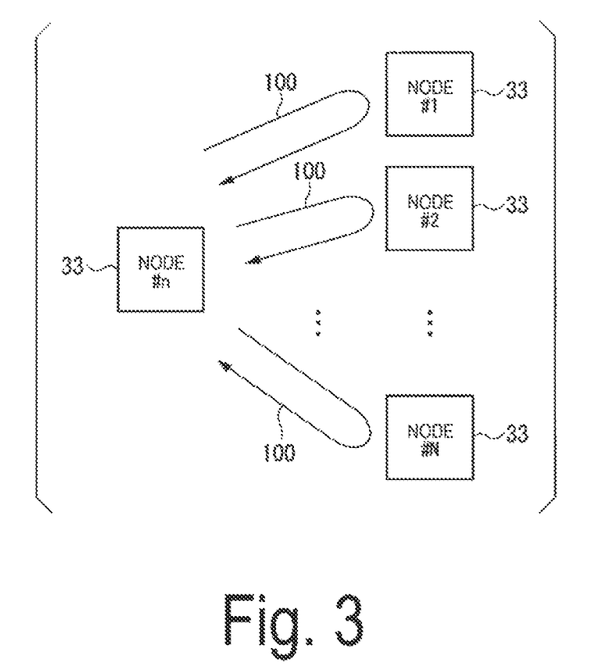
FIG. 3 is a diagram illustrating a notification example of a message when isolation is executed in a verification target path using a connectivity checking protocol.

FIG. 3 is a diagram illustrating a notification example of a message when the connectivity checking test is executed on the verification target path 4 using a connectivity checking protocol. Each node 33 in the verification target path 4 is a starting point of transmission of a request message. In FIG. 3, the node 33 "#n" (n is any integer that is equal to or greater than one and equal to or less than N) serving as a starting point transmits a message 100 (request message) to each node 33 (returning point of the message) other than the own node in the verification target path 4. In FIG. 3, exchange between the nodes 33 is visualized using the arrows of the messages 100. The arrow of each message 100 represents a request message from the node 33 at the starting point to the node 33 at the returning point and a response message from the node 33 at the returning point to the node 33 at the starting point.

In FIG. 3, the node 33 "#n" at the starting point of the message 100 transmits each message 100 (request message) to the nodes 33 other than the own node, that is, the node 33 "#1" to the node 33 "#N") at the returning points of the message 100. The node 33 "#n" receives the messages 100 (response messages) in response to the request message from the node 33 "#1" to the node 33 "#N." The connectivity checking test is executed using all the nodes 33 as the transmission starting points of the request messages.

Figure 4:
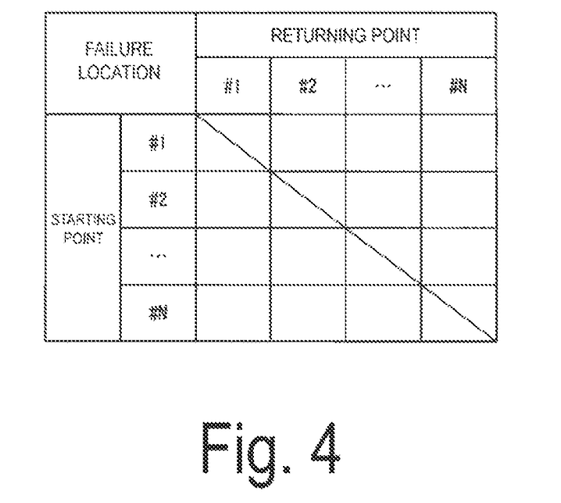
FIG. 4 is a diagram illustrating an example of pattern information of the verification target path including N nodes.

FIG. 4 is a diagram illustrating an example of the pattern information 210 of the verification target path 4 including N nodes. The pattern information 210 is information (pattern information) indicating whether the response message can be received by the node 33 for each combination of modeled nodes 33 in the verification target path 4. In other words, the pattern information 210 is information indicating whether the node 33 at the starting point can receive the response messages from the nodes 33 at the returning points.

A plurality of failure locations (multiple failures) may be included in the verification target path 4. The pattern information 210 is generated in advance for each of the one or more failure locations in the verification target path 4. Thus, the pattern information 210 is associated with the one or more failure locations.

In the pattern information 210, the case in which the node 33 at the starting point can receive a response message from each node 33 at the returning point is expressed as "Good (G)," for example. In the pattern information 210, the case in which the node 33 at the starting point cannot receive the response message from each node 33 at the returning point is expressed as "No Good (NG)," for example. "Good (G)" may be expressed as 0 while "No Good (NG)" may be expressed as 1. Note that, although "G" and "NG" are not described in FIG. 4, data such as "G" and "NG" is described at a place corresponding to a node combination in accordance with a fault location. Note that the held pattern information is not limited to information in the table format illustrated in FIG. 4 and may be information in another data format such as a text format. The held pattern information may include not only the information illustrated in FIG. 4, but also other information on the verification target path 4 (topology information indicating an inter-node connection relationship, for example).

In this manner, the pattern information 210 represents information on a result of success or not success in the connectivity checking test for each fault location in the modeled path of the verification target path 4.

Next, a case in which the connectivity checking test is executed on a service path in the actual communication network 3 will be described.

In a case in which occurrence of a failure in a certain service path has been detected, the estimation apparatus 2 transmits an instruction for the connectivity checking test of each network device that configures the service path. Each network device that has received the instruction performs the connectivity checking test on the network device designated by the instruction from the estimation apparatus 2 and returns the result to the estimation apparatus 2. In this embodiment, a case will be described in which the ICMP protocol is used as the connectivity checking protocol used in the connectivity checking test and "ping" is used for the connectivity checking test. The estimation apparatus 2 detects a failure in the network using an alert or the like, extracts a target service path, and then selects network devices that belongs to the service path. The estimation apparatus 2 transmits an instruction for starting an operation of transmitting a request message (hereinafter, referred to as a "transmission start instruction") to the selected network devices. The network device that has received the transmission start instruction transmits a request message to each network device at the returning point of the request message. The network device that has received the transmission start instruction receives a response message in response to the request message from the network device at the returning point.

The processing unit 20 illustrated in FIG. 1 includes a failure detection unit 200, a device selection unit 201, an instruction transmission and reception unit 202, and a location estimation unit 203. The processing unit 20 is partially or entirely implemented by causing a processor such as a CPU to execute a program stored in the storage unit 21. Each of the functional units in the processing unit 20 may be partially or entirely implemented using hardware such as a large scale integration (LSI) or an application specific integrated circuit (ASIC), for example.

The failure detection unit 200 detects occurrence of a failure in a service path in the communication network 3. The failure detection unit 200 detects occurrence of a failure (possibility of a failure) in a case in which reception of data transmitted from the user network 32-1 illustrated in FIG. 2 has timed out in the user network 32-2 (system warning), for example.

In a case in which occurrence of a failure in the communication network 3 has been detected, the device selection unit 201 extracts a service path that is affected by the failure and selects M network devices that configure the service path from among the plurality of network devices included in the communication network 3.

In a case in which a "ping" transmission instruction has been input by an operator, the device selection unit 201 may select M network devices configuring the service path from among the plurality of network devices included in the communication network 3.

The instruction transmission and reception unit 202 transmits a transmission start instruction to each of the selected network devices in order. Note that the transmission start instruction may be transmitted to some or all of the selected network devices at the same time. Each network device reports a result of the connection checking test executed in response to the transmission start instruction to the instruction transmission and reception unit 202. The location estimation unit 203 stores the result of the connection checking test in a usable format.

The location estimation unit 203 estimates a failure location in the service path on the basis of a result of comparing pattern information that satisfies "N=M" in the pattern information 210 held by the storage unit 21 with the connectivity checking test reported by the respective network devices selected by the device selection unit 201.

In the following case, even if the communication network 3 has been changed, the location estimation unit 203 can estimate a failure location when the number of network devices in the service path, the failure location of which needs to be identified, is smaller than N. In other words, the location estimation unit 203 can continuously execute a test for checking connectivity of the network devices (connectivity checking test) ion the change in the communication network 3 without changing pattern information. Here, the above-described case means that the pattern information is generated in advance under a condition of "N>$M_{max}$" and is held in the storage unit 21. The above-described change means, for example, addition, change, or deletion of a service path, or addition, change, or deletion of a network device.

The storage unit 21 is preferably a non-volatile recording medium (non-transitory recording medium) such as a flash memory or a hard disk drive (HDD), for example. The storage unit 21 may include a volatile recording medium such as a random access memory (RAM). The storage unit 21 stores pattern information 210 for each failure location in the verification target path 4. The storage unit 21 stores pattern information 210 with a size of 2×2, pattern information 210 with a size of 3×3, . . . , pattern information 210 with a size of N×N in advance.

Next, details of processing of estimating a failure location in the actual communication network 3 will be described.

The estimation apparatus 2 can simulate a connection relationship that is the same as that of a service path including M network devices 30 using the verification target path 4 through the following association. The above-described association means that each network device configuring the service path as a target of the test is associated with each generalized node (each node on the model) in estimation.

Figure 5:
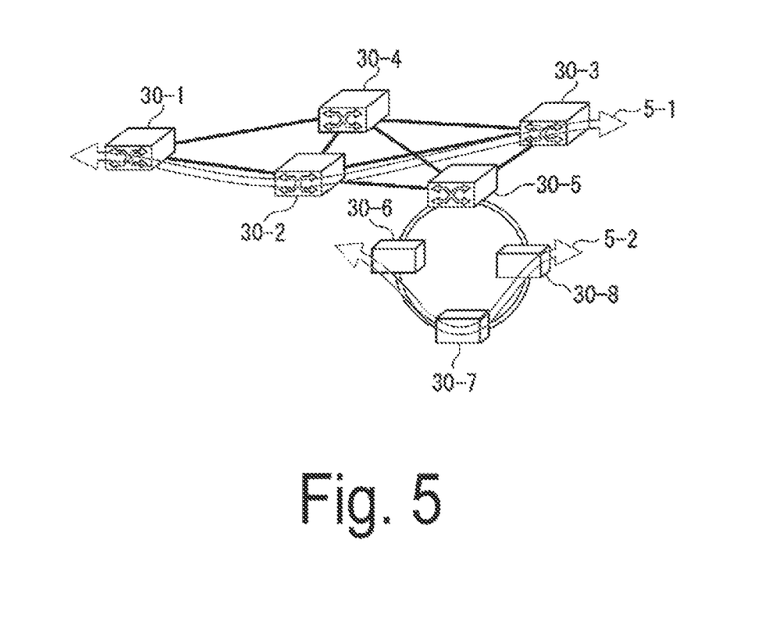
FIG. 5 is a diagram illustrating a configuration example of a communication network.

FIG. 5 is a diagram illustrating a configuration example of the communication network 3. In FIG. 5, the communication network 3 includes eight network devices 30. The network devices 30 may be physical nodes, logical nodes, or a combination of physical nodes and logical nodes. A service path 5-1 that is a first service path includes three network devices, namely a network device 30-1, a network device 30-2, and a network device 30-3. A service path 5-2 that is a second service path includes three network devices, namely a network device 30-6, a network device 30-7, and a network device 30-8.

Figure 6:
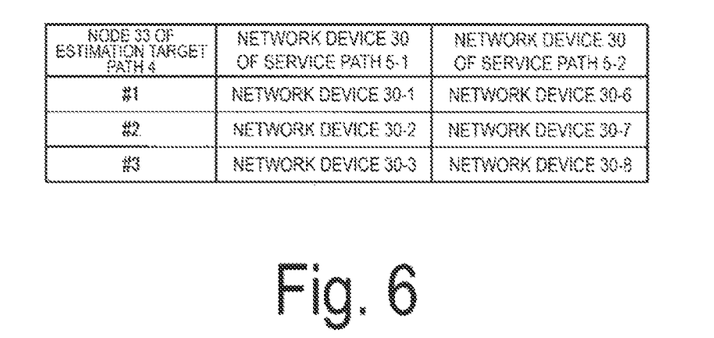
FIG. 6 is a diagram illustrating an example of a correspondence between each node of a verification target path of "N=3" generated as pattern information and each network device configuring each service path.

FIG. 6 is a diagram illustrating an example of a correspondence between each of nodes 33 in the verification target path 4 of "N=3" generated as pattern information and network devices 30 configuring each service path 5. Each node in the verification target path 4 is associated with each network device 30 configuring each service path 5 in the communication network 3. Note that the location estimation unit 203 associates the verification target path 4 with the service path 5 in a stage in which the verification target path 4 and the service path 5 are compared with each other and estimates a failure location. The location estimation unit 203 may hold correspondence information as illustrated in FIG. 6 in the storage unit in advance and estimate the failure location using the held correspondence information. In this case, the location estimation unit 203 needs to update the correspondence information to the latest one in response to a change in the communication network 3.

In a case in which occurrence of a failure in, for example, the service path 5-1 has been detected the device selection unit 201 selects the network device 30-1, the network device 30-2, and the network device 30-3 configuring the service path 5-1.

Identification of a failure location in a case in which a failure has occurred in the service path 5-1 will be described below.

Figure 7:
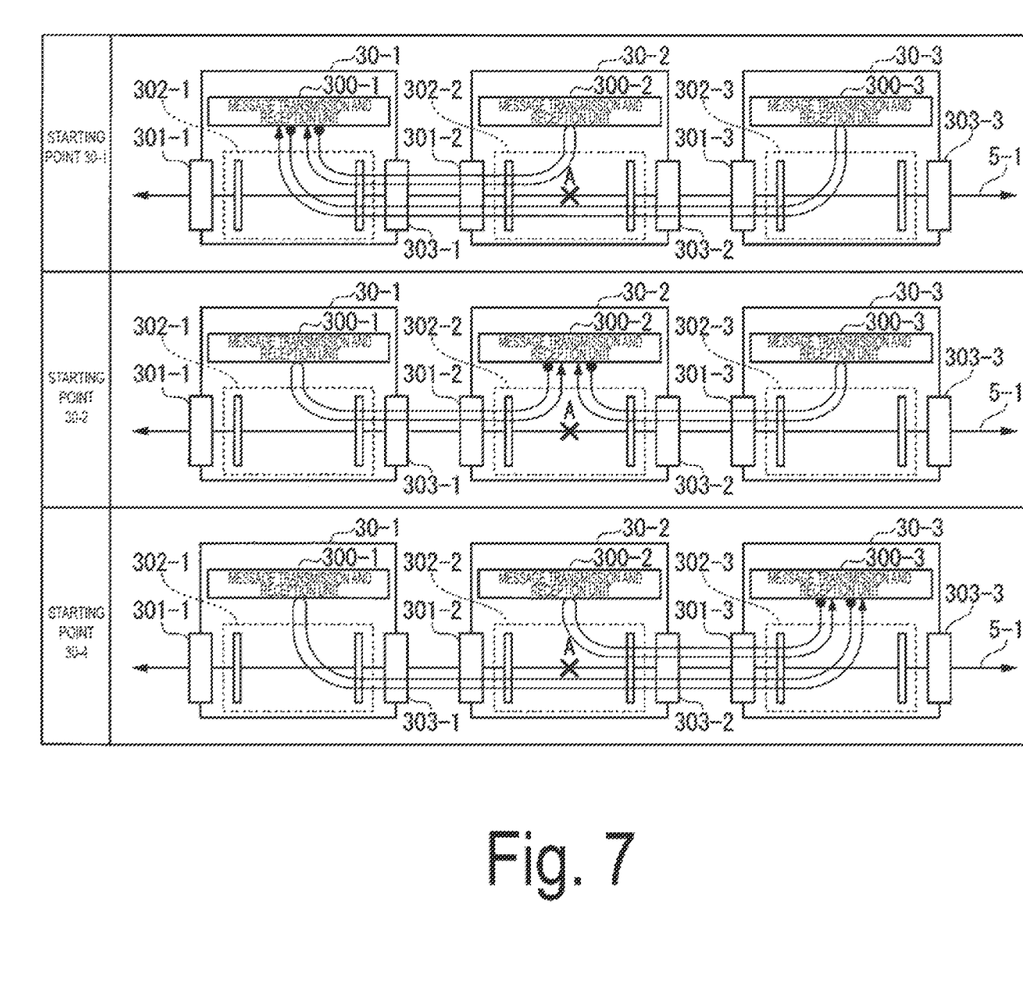
FIG. 7 is a diagram illustrating a first example of a failure location.

FIG. 7 is a diagram illustrating a first example of a failure location (failure location "A"). Each network device 30 includes a message transmission and reception unit 300, an interface 301, and a switch function unit 302. Each network device 30 is partially or entirely implemented by causing a processor such as a CPU to execute a program stored in the storage unit. Functional units in each network device 30 may be partially or entirely implemented using hardware such as an LSI or an ASIC, for example.

The message transmission and reception unit 300 is a functional unit ("ping" engine) that transmits and receives request messages and transmits and receives response messages. In a case in which a transmission start instruction is acquired from the instruction transmission and reception unit 202, the message transmission and reception unit 300 executes "ping" on the network device 30 designated in the instruction. In other words, in a case in which the transmission start instruction is acquired from the instruction transmission and reception unit 202, the message transmission and reception unit 300 transmits a request message (echo request) to the network device 30 designated in the instruction. The message transmission and reception unit 300 may receive a response message (echo reply) from the network device 30 that has transmitted the request message.

The interface 301 transfers the request message and the response message to network devices 30 adjacent to the own network device. The interface 301 transfers the request message and the response message to the switch function unit 302. The switch function unit 302 sorts the request message and the response message directed to the own network device to the message transmission and reception unit of the own network device. The switch function unit 302 relays messages directed to network devices other than the own network device to the adjacent network devices. Note that the switch function unit 302 may perform address translation through signal processing or the like. The interface 303 operates similarly to the interface 301. Note that not only the messages, but also various kinds of data transmitted via the service path flow the interface 303 and the switch function unit 302.

In FIG. 7, an example in which a failure has occurred in relay performed by the switch function unit 302-2 of the network device 30-2 is represented as a failure location "A". The instruction transmission and reception unit 202 transmits a transmission start instruction to the selected network device 30-1. The message transmission and reception unit 300-1 of the network device 30-1 at the starting point transmits a request message (for example, an "echo request" message) to the network device 30-2 and receives a response message (for example, an "echo reply" message) from the network device 30-2. The network device 30-1 at the starting point transmits a request message to the network device 30-3 but cannot receive any response message from the network device 30-3 due to the failure.

Next, the instruction transmission and reception unit 202 transmits a transmission start instruction to the selected network device 30-2. The network device 30-2 at the starting point transmits a request message to the network device 30-1 and receives a response message from the network device 30-1. The network device 30-2 at the starting point transmits a request message to the network device 30-3 and receives a response message from the network device 30-3.

Finally, the instruction transmission and reception unit 202 transmits a transmission start instruction to the selected network device 30-3. The network device 30-3 at the starting point transmits a request message to the network device 30-1 but cannot receive a response message from the network device 30-1 due to the failure. The network device 30-3 at the starting point transmits a request message to the network device 30-2 and receives a response message from the network device 30-2.

Figure 8:
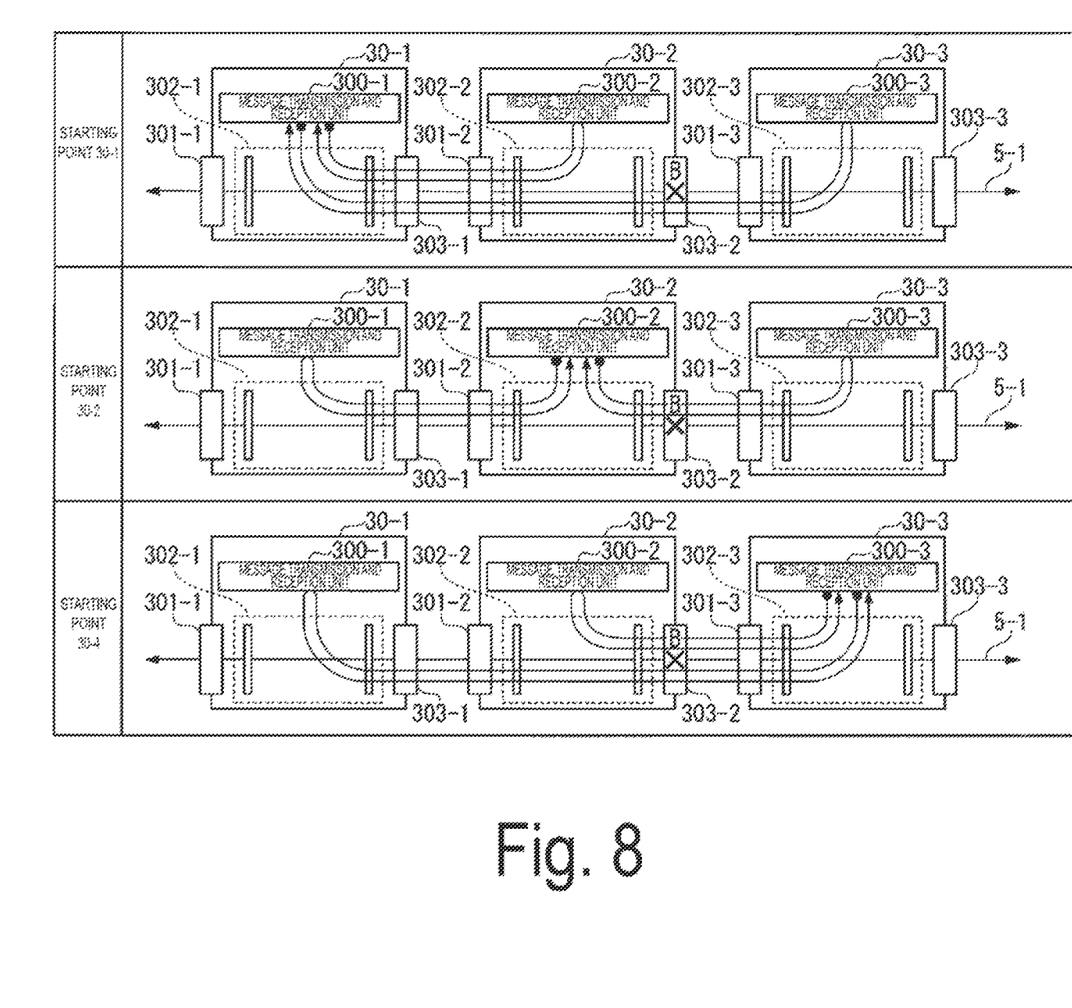
FIG. 8 is a diagram illustrating a second example of the failure location.

FIG. 8 is a diagram illustrating a second example (failure location "B") of a failure location. In FIG. 8, an example in which a failure has occurred in the interface 303-2 of the network device 30-2 is represented as a failure location "B". The instruction transmission and reception unit 202 transmits a transmission start instruction to the selected network device 30-1. The message transmission and reception unit 300-1 of the network device 30-1 at the starting point transmits a request message to the network device 30-2 and receives a response message from the network device 30-2. The network device 30-1 at the starting point transmits a request message to the network device 30-3 but cannot receive a response message from the network device 30-3 due to the failure.

Next, the instruction transmission and reception unit 202 transmits a transmission start instruction to the selected network device 30-2. The network device 30-2 at the starting point transmits a request message to the network device 30-1 and receives a response message from the network device 30-1. The network device 30-2 at the starting point transmits a request message to the network device 30-3 but cannot receive a response message from the network device 30-3 due to the failure.

Finally, the instruction transmission and reception unit 202 transmits a transmission start instruction to the selected network device 30-3. The network device 30-3 at the starting point transmits a request message to the network device 30-1 but cannot receive a response message from the network device 30-1 due to the failure. The network device 30-3 at the starting point transmits a request message to the network device 30-2 but cannot receive a response message from the network device 30-2 due to the failure.

Figure 9:
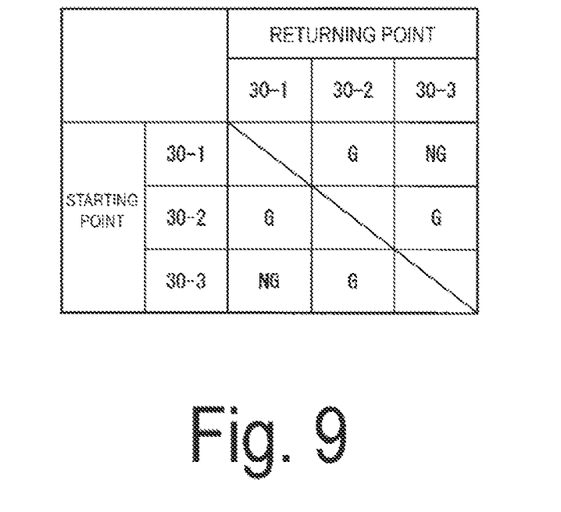
FIG. 9 is a diagram illustrating an example of result information in the first example of the failure location.

FIG. 9 is a diagram illustrating result information of the connection checking test in the first example of the failure location (the failure location "A" illustrated in FIG. 6). The location estimation unit 203 acquires pattern information 210 as illustrated in FIG. 4 from the storage unit 21. The location estimation unit 203 acquires pattern information 210 of "N=3" from the storage unit 21 in accordance with the number "M=3" of the network devices configuring the service path 5-1. The location estimation unit 203 shapes (rearranges) the result of the connection checking test so as to have a data format in which a topology of the service path corresponds to a topology registered as pattern information. The above-described format in which the topologies correspond to each other is a correspondence as illustrated in FIG. 6. Next, the location estimation unit 203 compares the result of the connection checking test with the acquired pattern information of "N=3".

As a result of the comparison, the pattern information of "N=3" indicating a failure in the relay unit of the node "#2" matches the result of the connection checking test. Thus, the location estimation unit 203 estimates that there has been a relay function failure in the switch function unit 302 (failure location "A") of the corresponding network device 30-2 in the service path 5-1.

Figure 10:
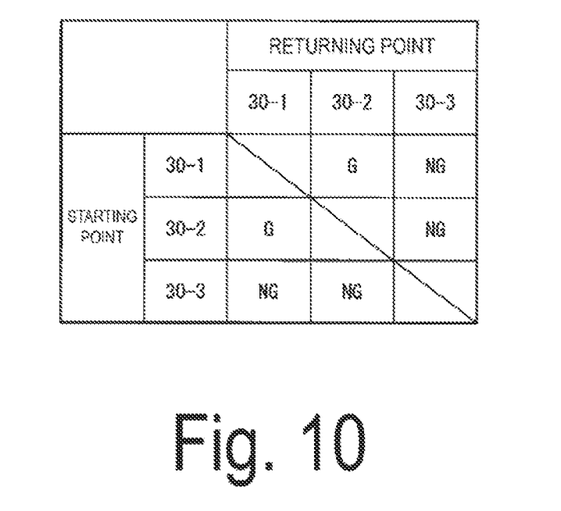
FIG. 10 is a diagram illustrating an example of result information in the second example of the failure location.

FIG. 10 is a diagram illustrating an example of result information in the second example of the failure location (failure location "B" illustrated in FIG. 7). The location estimation unit 203 estimates the fault location in the same procedure as that for identifying the fault location in FIG. 9. The location estimation unit 203 compares pattern information with the result of the connectivity checking test. Pattern information of "N=3" indicating a failure between the node "#2" and the node "#3" matches the result of the connectivity checking test. Thus, the location estimation unit 203 estimates that there has been a link failure between the network device 30-2 and the network device 30-3 in the service path 5-1 (failure location "B") corresponding to the respective nodes.

Figure 11:
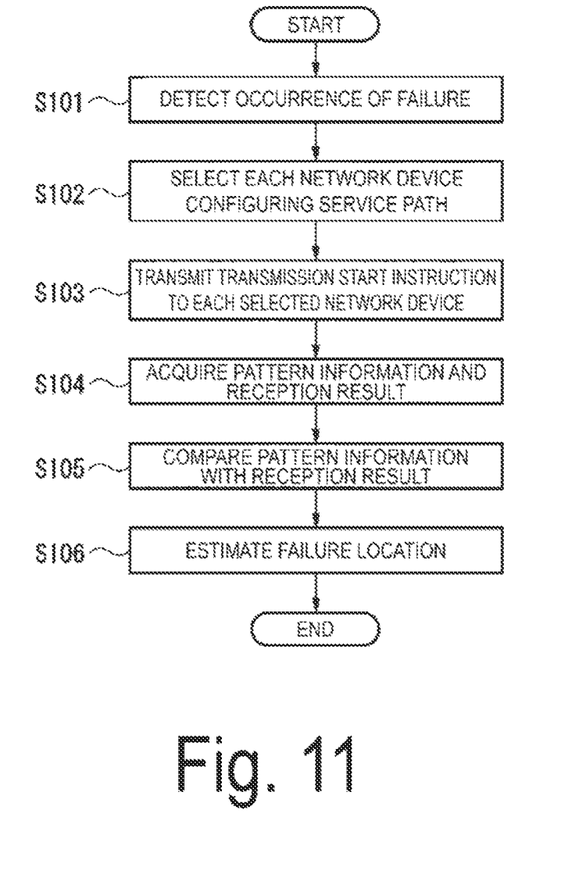
FIG. 11 is a flowchart illustrating an operation example of the estimation system.

Next, an operation example of the estimation system 1 will be described. FIG. 11 is a flowchart illustrating an operation example of the estimation system 1. The failure detection unit 200 detects occurrence of a failure in the communication network. Here, the failure detection unit 200 acquires a report regarding occurrence of a failure from an operator. The failure detection unit 200 may acquire information regarding occurrence of the failure from a management device that separately manages the network (Step S101). The device selection unit 201 extracts a service path 5 in which occurrence of the failure has been detected and selects network devices 30 configuring the service path (Step S102). Note that, in the selection of the network devices 30, the device selection unit 201 may acquire, from the management device, information regarding the network devices 30 configuring the service path 5. The device selection unit 201 may acquire the information regarding the network devices 30 configuring the service path 5 before the occurrence of the failure.

The instruction transmission and reception unit 202 transmits a transmission start instruction to each of the selected network devices 30 and receives a result of a connectivity checking test in accordance with the transmission start instruction from each of the network devices (Step S103). The location estimation unit 203 aggregates and shapes the result (reception result) of the connectivity checking test. The location estimation unit 203 acquires pattern information 210 of "N" nodes 33. The number N is equal to the number "M" of the network devices 30 configuring the service path 5 (Step S104). Note that, at the time of acquisition, only pattern information 210 of the N nodes 33 that have the same topology as the network topology of the service path 5 may be acquired.

The location estimation unit 203 compares the result of the connectivity checking test with the acquired pattern information 210 for each failure location (Step S105).

The location estimation unit 203 estimates the failure location associated with the pattern information 210 that matches the result of the connectivity checking test as the failure location in the service path 5 (Step S106).

Note that each network device 30 at the returning point of the request message may transmit a response message to the network device 30 at the starting point or to the estimation apparatus 2. The estimation apparatus 2 estimates (identifies) the failure location in the service path 5 on the basis of a result of comparing result information indicating whether the network device 30 has actually been able to receive the response message with the pattern information.

As described above, the estimation apparatus 2 according to this embodiment estimates a failure location in the service path 5 that is a communication line or a communication path configured in the communication network 3. The estimation apparatus 2 includes the generation unit 10, the device selection unit 201, the instruction transmission and reception unit 202, and the location estimation unit 203. The generation unit 10 generates information regarding success or not success in the connectivity checking test between the nodes 33 in a case in which a failure has occurred at one or more locations in the verification target path 4 including the "N (N is equal to or greater than two)" nodes. This information is generated as the pattern information 210 for each failure location in advance. The device selection unit 201 selects "M (M is equal to or greater than two)" network devices 30 configuring the service path 5 from among the plurality of network devices 30 in the communication network 3 in accordance with occurrence of a failure. The instruction transmission and reception unit 202 executes the connectivity checking test between the selected network devices 30. The location estimation unit 203 compares the checking result of the connectivity checking test with the pattern information that satisfies "N=M" in the pattern information 210 generated in advance. In a case in which the pattern information that satisfies "N=M" matches the checking result, the location estimation unit 203 estimates the failure location in the service path 5 on the basis of the failure location associated with the pattern information that satisfies "N=M".

The estimation apparatus 2 according to this embodiment can thus estimate the failure location on the basis of the pattern information 210 without changing network information for comparison and a program for comparison in accordance with a change in the communication network 3.

The first network device 30 configuring the service path 5 transmits the request message to the second network device 30 configuring the service path 5 in the connectivity checking test. The second network device 30 transmits the response message to the first network device 30 in the connectivity checking test. The first network device 30 transmits the reception result of the response message to the estimation apparatus 2. The second network device 30 may transmit the response message to the estimation apparatus 2 instead of transmitting the response message to the first network device 30 in the connectivity checking test. The estimation apparatus 2 can thus estimate the failure location on the basis of the response message.

A result of simply associating the failure location in each service path 5 with the result information of the response message is complicated, and the number of associations (combinations) is huge. The present invention generates and store the pattern information of the modeled verification target path in advance, which makes it possible to apply the same pattern information to a plurality of service paths and to estimate a failure location. In this manner, the number of pieces of the pattern information 210 (patterns) stored in the storage unit 21 in advance is curbed.

The embodiments of the present invention have been described above in detail with reference to the drawings. However, specific configurations are not limited to those embodiments, and include any design or the like within the scope not departing from the gist of the present invention.

Although the example in which the "ping" command is used has been described in the aforementioned embodiment, the estimation apparatus 2 may use a "traceroute" command that is a command of the Internet Control Message Protocol for checking a route of a communication network instead of the "ping" command. In the case in which the "traceroute" command is used, the estimation apparatus 2 can check not only continuity (connectivity) from the network device 30 at the starting point to the network device 30 at the returning point but also continuity (connectivity) of the relay network device 30 from the network device 30 at the starting point to the network device 30 at the returning point. This enables the estimation apparatus 2 to reduce a procedure required for checking continuity between the network devices 30 as compared with the case in which the "ping" command is used. The connectivity checking test may be performed using a protocol other than the ICMP.

The apparatus according to the present invention can also be implemented by a computer and a program. The program can be recorded in a recording medium and provided through a network.

In other words, the estimation apparatus and the network devices (nodes) in the aforementioned embodiment may be implemented by a computer. In such a case, the apparatus and the network devices according to the present invention may be achieved by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Furthermore, the above program may be a program for implementing a part of the above-mentioned functions. The above program may be a program capable of implementing the above-mentioned functions in combination with another program already recorded in a computer system. The above program may be a program to be implemented with the use of a programmable logic apparatus such as a field programmable gate array (FPGA).

INDUSTRIAL APPLICABILITY

The present invention can be applied to a communication system.

REFERENCE SIGNS LIST

1 Estimation system
2 Estimation apparatus
3 Communication network
4 Verification target path
5 Service path
10 Generation unit
20 Processing unit
21 Storage unit
30 Network device
31 User network interface
32 User network
33 Node
100 Message
200 Failure detection unit 201 Device selection unit
202 Instruction transmission and reception unit
203 Location estimation unit
210 Pattern information
300 Message transmission and reception unit
301 Interface
302 Switch function unit
303 Interface

The invention claimed is:

1. An estimation method executed by an estimation apparatus configured to estimate a failure location in a service path that is a communication line or a communication path configured in a communication network, the estimation method comprising:
generating information regarding success or not success in a connectivity checking test between "N (N is equal to or greater than two)" nodes in a case in which a failure occurs at one or more locations in a verification target path including the N nodes, the information being generated as pattern information for each failure location in advance;
selecting "M (M is equal to or greater than two)" network devices configuring the service path from among a plurality of network devices in the communication network in accordance with occurrence of the failure;
executing the connectivity checking test between the selected network devices;
comparing a checking result of the connectivity checking test with the pattern information that satisfies "N=M" in the pattern information generated in advance; and
estimating the failure location in the service path based on the failure location associated with the pattern information that satisfies "N=M" in a case in which the pattern information that satisfies "N=M" matches the checking result.

2. The estimation method according to claim 1, wherein the number of the nodes in the verification target path is greater than the number of network devices in the service path including a maximum number of network devices among a plurality of the service paths configured in the communication network.

3. The estimation method according to claim 1, wherein a first network device of the network devices configuring the service path transmits a request message to a second network device of the network devices configuring the service path in the connectivity checking test.

4. The estimation method according to claim 3, wherein the second network device configuring the service path transmits a response message to the first network device configuring the service path or the estimation apparatus in the connectivity checking test.

5. The estimation method according to claim 3, wherein the request message is a message of ping or traceroute using Internet Control Message Protocol (ICMP).

6. The estimation method according to claim 1, wherein the network devices are at least either physical nodes or logical nodes in the communication network.

7. An estimation apparatus configured to estimate a failure location in a service path that is a communication line or a communication path configured in a communication network, the estimation apparatus comprising:
a processor; and
a storage medium having computer program instructions stored thereon, when executed by the processor, perform to:
generate information regarding success or not success in a connectivity checking test between "N (N is equal to or greater than two)" nodes in a case in which a failure occurs at one or more locations in a verification target path including the N nodes, the information being generated as pattern information for each failure location in advance;
select "M (M is equal to or greater than two)" network devices configuring the service path from among a plurality of network devices in the communication network in accordance with occurrence of the failure;
execute the connectivity checking test between the selected network devices; and
compare a checking result of the connectivity checking test with the pattern information that satisfies "N=M" in the pattern information generated in advance, and, in a case in which the pattern information that satisfies "N=M" matches the checking result, estimate the failure location in the service path based on the failure location associated with the pattern information that satisfies "N=M".

8. An non-transitory computer-readable medium having computer-executable instructions that, upon execution of the instructions by a processor of a computer, cause the computer to execute the estimation method claim 1.

9. The estimation apparatus according to claim 7, wherein the number of the nodes in the verification target path is greater than the number of network devices in the service path including a maximum number of network devices among a plurality of the service paths configured in the communication network.

10. The estimation apparatus according to claim 7, wherein a first network device of the network devices configuring the service path transmits a request message to a second network device of the network devices configuring the service path in the connectivity checking test.

11. The estimation apparatus according to claim 10, wherein the second network device configuring the service path transmits a response message to the first network device configuring the service path or the estimation apparatus in the connectivity checking test.

12. The estimation apparatus according to claim 10, wherein the request message is a message of ping or traceroute using Internet Control Message Protocol (ICMP).

13. The estimation apparatus according to claim 7, wherein the network devices are at least either physical nodes or logical nodes in the communication network.

* * * * *